United States Patent [19]

Lim et al.

[11] 3,875,131

[45] Apr. 1, 1975

[54] PROCESS FOR PRODUCING HEAT-STABLE POLYVINYL CHLORIDE

[75] Inventors: Drahoslav Lim, Stanford, Calif.; Miloslav Kolinsky; Vaclava Jisova, both of Prague, Czechoslovakia

[73] Assignee: Ceskaslovenska Akademi Ved., Prague, Czechoslovakia

[22] Filed: June 29, 1972

[21] Appl. No.: 267,545

Related U.S. Application Data

[63] Continuation-in-part of Ser. No. 147,597, May 27, 1971, abandoned.

[30] Foreign Application Priority Data

June 11, 1970 Czechoslovakia ............... 4110-70

[52] U.S. Cl. ............................................. 260/92.8 R
[51] Int. Cl. ........................... C08f 1/28, C08f 3/30
[58] Field of Search ............................... 260/92.8 R

[56] References Cited
UNITED STATES PATENTS 3,183,201  5/1965  Shimeha et al. ................... 260/31.2

OTHER PUBLICATIONS

Chemical Abstracts, Vol. 53: 11891g, 1959, Catalysts for Vinyl Chloride Polymerization.

J. P. S. 41, pp. 79–81 (1959).

*Primary Examiner*—Joseph L. Schofer
*Assistant Examiner*—John Kight
*Attorney, Agent, or Firm*—Murray Schaffer

[57] ABSTRACT

Polymerization of vinyl chloride in the presence of highly pure tert-butyl-lithium catalyst to produce heat-stable polyvinyl chloride. The reaction is carried out at temperatures maintained in the range of from $-20°C$ to $+30°C$ and preferably in the range of from $0°C$ to $+20°C$. The pressure is maintained in the range of from 1 to 4 atmospheres. The ratio of the catalyst to vinyl chloride is maintained in the range of from $1 \times 10^{-4}$ to $1 \times 10^{-2}$ and preferably from $1 \times 10^{-3}$ to $3 \times 10^{-3}$ by batchwise addition of the catalyst and in the range of from $1 \times 10^{-5}$ to $1 \times 10^{-3}$ in any portion at portionwise addition of the catalyst.

5 Claims, No Drawings

PROCESS FOR PRODUCING HEAT-STABLE POLYVINYL CHLORIDE

This application is a continuation-in-part of copending application U.S. Ser. No. 147,597, filed May 27, 1971, now abandoned and entitled "PROCESS OF PRODUCING HEAT-STABLE POLYVINYL CHLORIDE."

The present invention relates to a process of producing heat-stable polyvinyl chloride in the presence of highly pure tert-butyl-lithium as catalyst.

An earlier application, Ser. No. 108,567, relates to polymerization and production of a heat-stable fiber-forming polyvinyl chloride in the presence of a lithium complex catalyst which is formed by the reaction of an alkyllithium with an organometallic compound of a metal selected from Group IV of the Periodic Table of Elements, or with an alkoxide of a metal selected from Groups I–III of the Periodic Table of Elements, either in a pure state or in the presence of electron-donor-type compounds. The polymerization is performed at temperatures ranging from 20°C below zero to 30°C above zero.

SUMMARY OF INVENTION

It has now been found that the tert-butyl-lithium catalyzed polymerization of vinyl chloride with or without the presence of solvents results in the production of polymers of a high average molecular weight and which exhibit a narrow distribution of molecular weights. Solvents which can be used in the polymerization are those solvents which do not react with the catalyst, particularly hydrocarbon solvents. To our best knowledge, tert-butyl-lithium hs never been used in the polymerization of vinyl chloride. The polymers obtained by polymerization in the presence of tert-butyl-lithium catalyst exhibit considerably increased heat stability despite the fact that their isotactic and syndiotactic structures do not differ to any appreciable extent from polymers obtained by radical polymerization. Owing to the high heat stability, linear structure, and the high degree of polymerization, the polymers according to the present invention are especially suitable for the manufacture of highly heat-resistant articles, such as electric insulators or for the manufacture of heat-stable fibers.

The process of producing heat-stable polyvinyl chloride according to the present invention comprises polymerizing the corresponding monomer at a temperature in the range of from 20°C below zero to 30°C above zero and preferably in the range of 0°C to 20°C above zero, at a pressure in the range from 1 to 4 atmospheres in the prscence of tert-butyl-lithium containing less than $1 \times 10^{-1}\%$ by weight of impurities and preferably less than $1 \times 10^{-4}\%$ by weight.

The pressure range of 1 to 4 atmospheres corresponds to the vapor tension of vinyl chloride at the respective temperature in block polymerization (I. Dana, J. N. Burdich: J. Am. Soc. 49, 2801, 1927) or in solution polymerization to the product of the vapor tension of vinyl chloride and its molar fraction of the solution (according to Raoult's law). At temperatures below the boiling point of vinyl chloride, the difference from the atmospheric pressure is counter-balanced by the pressure of the inert gas.

The molecular weight of the polyvinyl chloride according to the present invention may be advantageously varied by employing the catalyst and vinyl chloride in a ratio of catalyst to vinyl chloride in a range of from $1 \times 10^{-4}$ to $1 \times 10^{-2}$ and preferably in a range of from $1 \times 10^{-3}$ to $3 \times 10^{-3}$. The molecular weight of the product may also be varied by varying the ratio of the monomeric vinyl chloride to the solvent or, by the use of different temperatures. To maintain a constant and low catalyst concentration, the catalyst is added portionwise or incrementally and the ratio of tert-butyl-lithium to vinyl chloride is maintained preferably in the range of from $1 \times 10^{-5}$ to $1 \times 10^{-3}$ in one portion.

The advantage of the vinyl chloride polymerization in the presence of highly pure tert-butyl-lithium consists in a considerably faster polymerization than with the use of radical initiators in emulsion, suspension, block, or solvent polymerization systems or in photopolymerization systems. Furthermore, as mentioned above, the rate of polymerization may be efficiently controlled by the concentration of the catalysts or of the monomer, and, to some extent, by the temperature. The polymerization process according to the present invention also makes it possible to readily obtain the required degree of polymerization that is, in the range of from 50 to 2,500 indicative of molecular weight in a range of about 3,000 to about 250,000. The resulting polymers especially the polymers at the upper end of the molecular weight range are much more heat-stable than those obtained by conventional polymerization processes. Moreover, at about 20°C, the requirements of the process according to the present invention for the polymerization heat removal are minimal.

With the use of the present polymerization process, a much more advantageous, i.e., narrower distribution of molecular weights is attained than with the usual radical polymerization. The excellent physical and mechanical properties of the polymers obtained by the process according to the present invention are due to an almost complete linearity and minimum of chain branchings. The increased stability of the polymer against the action of heat, light, and other deleterious agents may be ascribed to an almost complete absence of defective or unstable regions. Consequently, polymers according to the present invention may be advantageously used for the same purposes as those prepared by radical polymerization methods.

The polymerization process according to the present invention may be performed in conventional apparatus with minimum modifications. Moreover, the present process does not require any expensive cooling equipment.

The present invention is further illustrated by the following EXAMPLES which are not limitative. In the Examples, all parts and percents are by weight unless otherwise stated.

DESCRIPTION OF PREFERRED EMBODIMENTS

EXAMPLE 1

A polymerization vessel equipped with or without a stirrer is flushed with an inert gas and charged with 28.7 g of rectified vinyl chloride. The temperature is adjusted to about 20°C and a hydrocarbon solution of tert-butyl-lithium catalyst is added in the ratio of tert-butyl-lithium to vinyl chloride equal to $3.3 \times 10^{-3}$. The polymerization lasts two hours and is stopped by the addition of water. The resulting polymer is washed with water and methanol, and dried. Yield, 4.965 g of polyvinyl chloride, i.e., 17.3%. Intrinsic viscosity (limiting viscosity number) $[\eta] = 1.183$ (in cyclohexanone).

Number-average molecular weight as calculated from the Danusso's empirical formula, $M_n = 62\,400$. The heat-stability of the product is 30 minutes at 180°C without any stabilizer while the commercial product (suspension polyvinyl chloride, K value 85) is degraded under the same conditions after 20 minutes at 180°C.

EXAMPLE 2

The procedure of EXAMPLE 1 was repeated with the following materials, conditions and results. Starting material, 28.2 g of rectified vinyl chloride. Reaction temperature, $t = 12$°C. Reaction period, $\tau = 2$ hours. The ratio of tert-butyl-lithium to vinyl chloride, $1.67 \times 10^{-3}$. Yield, 3.19 g (10.3% by weight) of the polymer. Intrinsic viscosity (limiting viscosity number) $[\eta] = 1.114$; number-average molecular weight $M_n = 58,000$.

EXAMPLE 3

The procedure of EXAMPLE 1 was repeated with the following material and under the following conditions. Starting material, 31.6 g of vinyl chloride. Reaction temperature, $t = 5$°C. Reaction period of time, $\tau = 2$ hours. The ratio of tert-butyl-lithium to vinyl chloride, $1.67 \times 10^{-3}$. Yield, 4.124 g (13.5% by weight) of polyvinyl chloride. Intrinsic viscosity (limiting viscosity number) $[\eta] = 1.316$; number-average molecular weight $M_n = 71,760$.

EXAMPLE 4

The procedure of EXAMPLE 1 was repeated with the following materials and under the following conditions. Starting material, 8 g of vinyl chloride and 30 ml of heptane. Reaction temperature, 20°C. Reaction period of time, $\tau = 4$ hours. The ratio of tert-butyl-lithium to vinyl chloride, $1 \times 10^{-2}$. Yield, 2.522 g (31.2% by weight) of the polymer. Intrinsic viscosity (limiting viscosity number) $[\eta] = 0.4$; number-average molecular weight $M_n = 15,270$.

EXAMPLE 5

The procedure of EXAMPLE 1 was repeated with the following materials and under the following conditions. Starting material, 4.6 g of vinyl chloride and 27.9 g of heptane. Reaction temperature, $t = 20$°C. Reaction period of time, $\tau = 2¼$ hours. The ratio of tert-butyl-lithium to vinyl chloride, $3.33 \times 10^{-2}$. Yield, 0.833 g (17% by weight) of polyvinyl chloride. Intrinsic viscosity (limiting viscosity number) $[\eta] = 0.1275$; number-average molecular weight $M_n = 3,500$.

EXAMPLE 6

The details of EXAMPLE 1 were repeated with the following materials and under the following conditions. Starting material, 32.2 g of vinyl chloride. Reaction temperature, $t = 20$°C. The catalyst is added every eighth hour in three successive portions. Total reaction period of time, $\tau = 24$ hours. The ratio of tert-butyl-lithium (total) to vinyl chloride, $1.1 \times 10^{-3}$. Yield, 2.64 g (8.74% by weight) of polyvinyl chloride. Intrinsic viscosity (limiting viscosity number) $[\eta] = 2.128$; number-average molecular weight $M_n = 134,000$.

EXAMPLE 7

The procedure of Example 1 was repeated with the following materials and under the following conditions. Starting material, 30.0 g of rectified vinylchloride. Reaction temperature $t = 20$°C. Reaction period of time, $\tau = 8$ hours. The ratio of tert-butyl-lithium to vinylchloride, $1.67 \times 10^{-3}$. Yield of polymer 1.24 g (4.0 % by weight). Intrinsic viscosity $[\eta] = 0.962$; number-average molecular weight $\bar{M}_n = 47,800$.

EXAMPLE 8

The procedure of Example 1 was repeated with the following materials and under the following conditions. Starting material, 18.0 g of rectified vinylchloride and 20 ml of hexane. Reaction temperature, $t = 0$°C. Reaction period of time $\tau = 5$ hours. The concentration of tert-butyl-lithium catalyst (I) $= 2.5 \times 10^{-2}$ mole/l. Yield of polymer 3,38 g (18.8 % by weight). Intrinsic viscosity $[\eta] = 0.760$; number-average molecular weight $\bar{M}_n = 35\,170$.

EXAMPLE 9

The detail of Example 1 were repeated with the following materials and under the following conditions. Starting material, 1,600 g of rectified vinylchloride. Reaction temperature, $t = 5$°C. The catalyst is added in seven successive portions. Total reaction period of Time $\tau = 18$ hours. The concentration of tert-butyl-lithium (total) to vinylchloride, $1.0 \times 10^{-3}$. Yield of polymer 250 g (15.6 % by weight). Intrinsic viscosity $[\eta] = 3.077$; number-average molecular weight $\bar{M}_n = 216,200$.

EXAMPLE 10

For offering basic characteristic of thermostable poly(vinylchloride) marked Thervil prepared in the way described in Examples 1–9 were these samples compared with samples marked Geon and Hostalit. See Table I.

TABLE I

Basic characteristics of thermostable poly(vinyl chloride) marked Thervil[+] and comparison with Geon[+] and Hostalit[+] samples

| Sample No | Polymer | Color and appearance | $K_{ir}$ | $M_n \times 10^{-3}$ | Content of Cl % |
|---|---|---|---|---|---|
| 1 | Thervil 216 | white lumpy | 105 | 160.0 | 55.70 |
| 2 | Thervil 209 | white lumpy | 85 | 87.5 | 55.62 |
| 3 | Thervil 206 | white lumpy | 76 | 62.5 | 55.33 |
| 4 | Geon 111 | white semoline | 86 | 94.0 | 54.05 |
| 5 | Geon 121 | white lumpy | 75 | 62.0 | 54.17 |
| 6 | Geon 131 | white lumpy | 68 | 50.0 | 55.05 |
| 7 | Hostalit C 270 | white semoline | 69 | 56.0 | 53.70 |

[+]Note
  Mark    Origin
  Thervil–Samples of this patent application
  Geon    The samples of "Geon" 111, 121, 131 are standard polyvinyl chloride materials prepared by radical polymerization having differing molecular weights, but otherwise exhibit the characteristics set forth herein. Geon is the name used by the Japanese Geon Company Ltd., Tokyo. These materials have higher thermostability than conventional commercially available polyvinyl chloride;
  Hostalit  The samples of "Hostalit" C 270 is a polyvinyl chloride sold by Messrs. Farbwerke Hoechst, West Germany having standard characteristics of the materials herein set forth.

Geon – The samples of "Geon" 111, 121, 131 are standard polyvinyl chloride materials prepared by radical polymerization having differing molecular weights, but otherwise exhibit the characteristics set forth herein. Geon is the name used by the Japanese Geon Company Ltd., Tokyo. These materials have higher thermostability than conventional commercially available polyvinyl chloride;

Hostalit - The samples of "Hostalit" C 270 is a polyvinyl chloride sold by Messrs. Farbwerke Hoechst, West Germany having standard characteristics of the materials herein set forth.

EXAMPLE 11

Dehydrochloration of thermostable poly(vinyl chloride) marked Thervil prepared in the way described in Examples 1-9 and its comparison with samples marked Geon and Hostalit are given in Table II.

TABLE II

Course of Dehydrachloration of the Poly(vinyl chloride) Samples at 180 °C and 215 °C in air at the Rate of Flow 180 ml/min

| Sample No | Polymer | $[\eta]$ dl/g | $K_{tr}$ | Inhibition period of dehydrochloration | | Dehydrochloration rate $\mu$ mol HCl/g PVC/min | |
|---|---|---|---|---|---|---|---|
| | | | | 180 °C | 215 °C | 180 °C | 215 °C |
| 1 | Thervil 216 | 2,44 | 105 | 40 | 20 | 0,46 | 3,5 |
| 2 | Thervil 209 | 1,53 | 85 | 28 | 15 | 0,68 | 5,8 |
| 3 | Thervil 206 | 1,23 | 76 | 15 | 8 | 0,70 | 7,4 |
| 4 | Geon 111 | 1,62 | 86 | 6 | 3 | 1,5 | 18,6 |
| 5 | Geon 121 | 1,21 | 75 | 5 | 2 | 1,4 | 16,3 |
| 6 | Geon 131 | 1,00 | 68 | 12 | 2 | 3,2 | 23,6 |
| 7 | Hostalit | 1,09 | 69 | 6 | — | 1,25 | 8,7 |

EXAMPLE 12

Class-Transition temperatures and decomposition temperatures of thermostable poly(vinyl chloride) marked Thervil prepared in the way described in Examples 1-9 and its comparison with samples marked Geon and Hostalit are presented in table III.

TABLE III

Class-Transition Temperatures and Decomposition Temperatures

| Sample No. | Polymer | Tg °C | Decomposition Temp. (T) | |
|---|---|---|---|---|
| | | | Decomp.start | Total decomp. |
| 1 | Thervil 216 | 359 | 514 | 535 |
| 2 | Thervil 209 | 352 | 514 | 528 |
| 3 | Thervil 206 | 352 | 508 | 515 |
| 4 | Geon 111 | 352 | 499 | 513 |
| 5 | Geon 121 | 342 | 494 | 511 |
| 6 | Geon 131 | 340 | 475 | 509 |
| 7 | Hostalit C 270 | 348 | 493 | 496 |

EXAMPLE 13

Survey of the stability and stabilization ability of thermostable poly(vinyl chloride) marked Thervil prepared in the way described in Examples 1-9 and its comparison with samples marked Geon and Hostalit are shown in table IV. Samples of polymers calandered at 180°C. For samples marked Thervil the temperature was sufficient; for the other samples marked Geon and Hostalit the temperature was rather low.

TABLE IV

Percentage of Discoloration of Poly(vinyl chloride) samples without and with stabilizers at 180 °C after 10 min. of calendering process

| Sample No | Polymer | without stabilizer % Discol. | with stabilizer+ % Discol. |
|---|---|---|---|
| 1 | Thervil 216 | 60 | 49 |
| 2 | Thervil 209 | 60 | 57 |
| 3 | Thervil 206 | 61 | 53 |
| 4 | Geon 111 | 73 | 58 |
| 5 | Geon 121 | 100 | 61 |
| 6 | Geon 131 | 100 | 69 |
| 7 | Hostalit C 270 | 92 | 66 |

*Note: Used stabilizer Adwastab 61 is a stabilizer - mixture of esters of amino-crotonic acid, sold by the Advance Div., Carlisle Chemical Works, Inc., predominantly with 1,4-butylene glycol and fatty alcohols $C_{16} - C_{18}$ (the content of fatty alcohol is 10 - 15%).

EXAMPLE 14

Solvation test of thermostable poly(vinyl chloride) marked Thervil prepared in the way described in Example 1-9 and its comparison with samples marked Geon and Hostalit was carried out according the following procedure:

A part of the paste of polymer with dibutyl phtalate was introduced into holes (diameter = 8 mm), in 4 mm thick glass plate, paced on a sheet of filtering paper underlaid with another glass plate without hole. The solvation capacity of investigated polymer was evaluated with respect to the size of the spot formed in a filtering paper in 150 minutes. Samples of Thervil need two-times more dibutyl phtalate to form a spot corresponding to the compared samples and experimental data are given in table V.

TABLE V

Solvation Test of the Samples of Poly(vinyl chloride)

| Sample No. | Polymer | Mixture composition | | Spot dimensions after 150 min | |
|---|---|---|---|---|---|
| | | Sample g | DBP g | a cm | b cm |
| 1 | Thervil 216 | 1.25 | 3.0 | 42 | 37.5 |
| 2 | Thervil 209 | | | 29 | 25 |
| 3 | Thervil 206 | | | 30.5 | 27.5 |
| 4 | Geon 111 | 1.25 | 1.5 | 52.5 | 47 |
| 5 | Geon 121 | | | 29.5 | 26 |
| 6 | Geon 131 | | | 46 | 40.5 |
| 7 | Hostalit C 270 | | | 54 | 45 |

Numerous variations of the embodiments of the invention may be made without departing from the spirit and scope thereof. It is to be understood, therefore, that this invention is not to be limited to the described embodiments except as defined in the appended claims.

What is claimed:

1. Process for producing heat stable polyvinyl chloride comprising the steps of polymerizing the corresponding monomer at a temperate in the range of from about 20°C below zero to about 30°C above zero, at a pressure in the range of from about 1 to 4 atmospheres in the presence of tert-butyl-lithium catalyst containing less than $1 \times 10^{-1}$ % by weight of impurities and recovering heat-stable polyvinyl chloride.

2. Process according to claim 1 wherein the molecular weight of polyvinyl chloride is varied by the ratio of the catalyst to vinyl chloride in a range from about $1 \times 10^{-4}$ to $1 \times 10^{-2}$.

3. Process according to claim 1 wherein the catalyst is added in successive portions and wherein the concentration of the catalyst corresponds to the ratio of tert-butyl-lithium to vinyl chloride and is in a range of from about $1 \times 10^{-5}$ to $1 \times 10^{-3}$ in any portion of portionwise addition of catalyst.

4. Process according to claim 1 wherein the temperature is in a range of from about 0°C to about 20°C above zero and the catalyst contains less than about $1 \times 10^{-4}$ % by weight of impurities.

5. Process according to claim 2 wherein the ratio of catalyst to vinyl chloride is in a range of from about $1 \times 10^{-3}$ to $3 \times 10^{-3}$.

* * * * *